United States Patent [19]

Dahl et al.

[11] 4,089,247

[45] May 16, 1978

[54] BLIND FASTENER

[75] Inventors: Warren F. Dahl, Philadelphia; Richard C. Landt, Souderton, both of Pa.

[73] Assignee: Standard Pressed Steel Co., Jenkintown, Pa.

[21] Appl. No.: 699,926

[22] Filed: Jun. 25, 1976

[51] Int. Cl.² .............................................. F16B 31/02
[52] U.S. Cl. .......................................... 85/70; 85/72; 85/74
[58] Field of Search .......................... 85/70, 72, 73, 74

[56] References Cited

U.S. PATENT DOCUMENTS

| | | | |
|---|---|---|---|
| 2,324,142 | 7/1943 | Eklund | 85/70 |
| 2,887,003 | 5/1959 | Brilmyer | 85/73 |
| 3,236,143 | 2/1966 | Wing | 85/70 |
| 3,257,889 | 6/1966 | Fischer | 85/70 |
| 3,277,771 | 10/1966 | Reynolds | 85/72 |
| 3,369,442 | 2/1968 | Darby et al. | 85/70 |
| 3,396,996 | 8/1968 | Raptis | 85/74 |
| 3,443,474 | 5/1969 | Blakeley et al. | 85/72 |
| 3,643,544 | 2/1972 | Massa | 85/74 |
| 3,657,956 | 4/1972 | Bradley et al. | 85/74 |

FOREIGN PATENT DOCUMENTS 344,832  4/1960  Switzerland ........................ 85/73

*Primary Examiner*—Marion Parsons, Jr.
*Attorney, Agent, or Firm*—Andrew L. Ney; Aaron Nerenberg

[57] ABSTRACT

A blind fastener assembly includes, in one embodiment a pin, an expander and a sleeve. The pin and expander may include, in one configuration, mating threads for drawing the sleeve axially over the expander toward the blind side of a workpiece, or the pin may be a pull-type wherein the portion of the pin opposite from the blind side end has pull grooves which are adapted to be gripped by a conventional pull gun. The sleeve is a tubular member with a portion of its length having a normal radial thickness and a portion having reduced radial thickness comprising a reduced outer diameter over a portion of its axial length and a counter-bore along the same axial length adjacent one end of the sleeve. The expander extends through aligned holes in the workpieces and has a tapered nose surface proximate the reduced thickness portion of the sleeve. When an axial force is exerted on the pin, the reduced thickness portion of the sleeve is forced over the tapered nose surface on the expander toward the blind side of the workpiece and is expanded in diameter. The tapered surface of the expander also deforms and expands the inner diameter of the normal thickness portion of the sleeve where it meets the counter-bore, and when the leading edge of the sleeve contacts the blindside workpiece surface, an optimum shaped, maximum diameter bulb forms in the reduced thickness portion of the sleeve against the blindside workpiece surface. When the bulb is fully formed, a reduced diameter breakneck portion of the pin fractures at a predetermined torque or load, leaving a properly tensioned joint.

41 Claims, 19 Drawing Figures

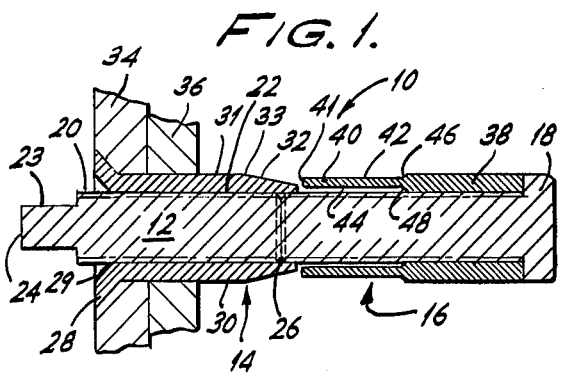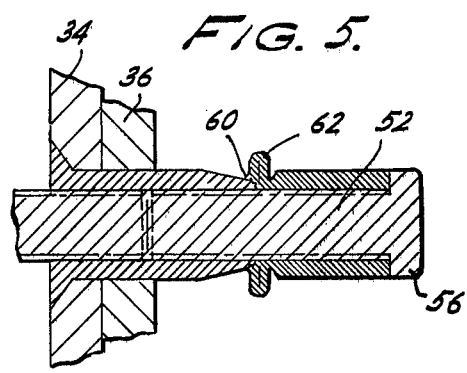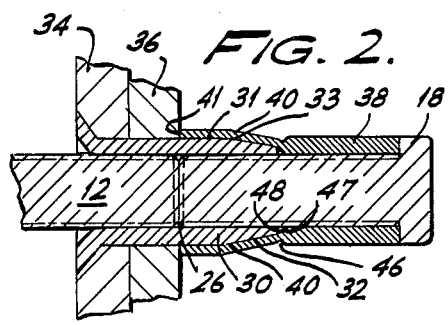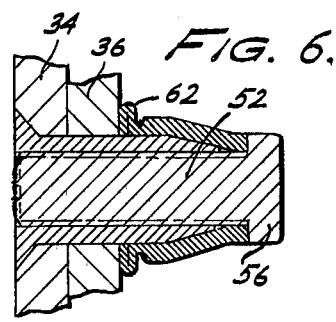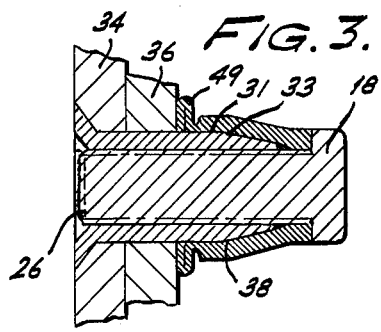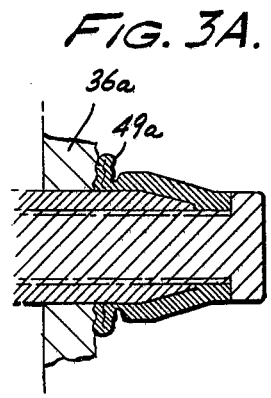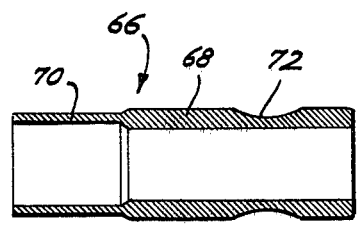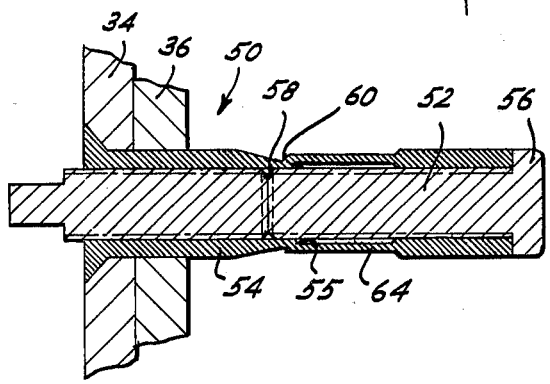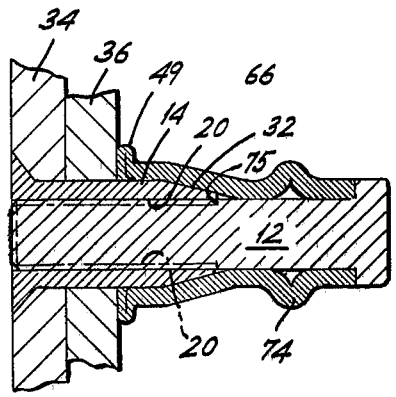

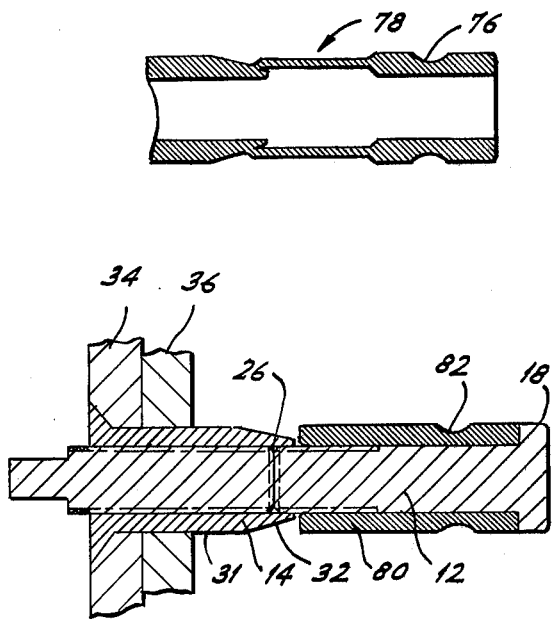
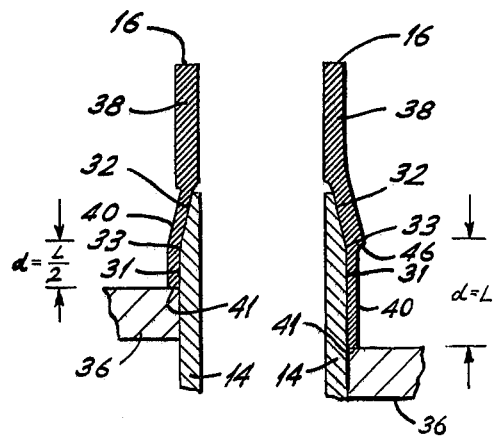
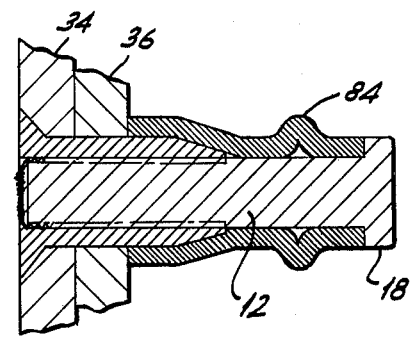
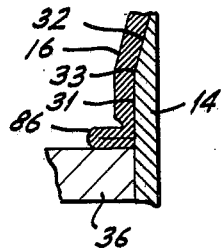
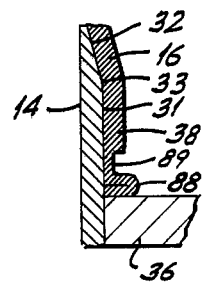
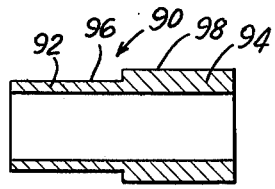
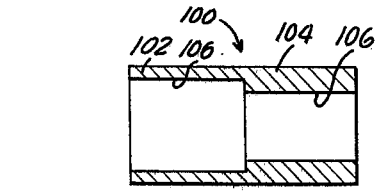
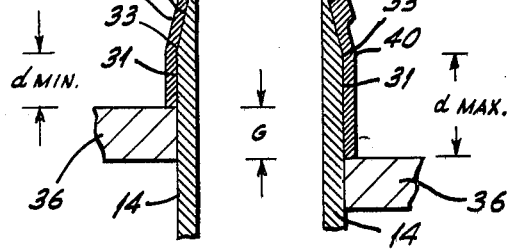

BLIND FASTENER

BACKGROUND OF THE INVENTION

This invention relates to improvements in blind fasteners and to the joints produced therewith.

Advanced composite materials have recently been gaining increasing usage in various aerospace applications because they offer potential weight savings and increased stiffness. The anisotropic properties of composite materials present a unique opportunity to optimize certain structural designs such as elongated aircraft stringers and ribs. In order to form acceptable joints of relatively thin sheet composite materials, conventional blind fasteners have not proven to be completely acceptable. One reason is the low allowable bearing stress of composite materials, which means that the full tensile strength of the blind fastener may not be realized because of bearing failure of the composite material. Present blind fasteners have a relatively limited blind side bearing area and typically expand to approximately 1.3 times the original sleeve diameter. Another reason is that composite materials are weaker in shear, thus causing any holes to require greater edge distances and more area build up to develop full efficiency of the composite material. These materials are further constructed of a resin matrix which has a tendency to crack when holes in the material are expanded, such as by cold working or by an interference fit fastener. Rivets which swell when upset may also crack the resin matrix. Composite materials are generally fabricated in layers and can be formed to complex shapes whose surfaces are not flat. Conventional blind fasteners generally cannot form to the irregular contour of the composite material surface and tend to crush the high points of the material, reducing overall material strength.

In order to solve these problems, the present invention is directed to an improved blind fastener which has a large bearing area, does not expand the holes in respective workpieces forming a joint in which the fastener is installed and forms to the contour of the blindside workpiece surface.

SUMMARY OF THE INVENTION

Accordingly, it is a general purpose and object of the present invention to provide an improved blind fastener assembly. It is a further object to provide an improved blind fastener assembly for use with composite materials. It is yet another object of the present invention to provide an improved blind fastener having a novel grip-accommodating feature. It is still a further object to provide a blind fastener assembly in which the blind side bearing surface will conform to an irregular contour of the blindside workpiece surface. And it is an object of the present invention to provide a blind fastener assembly which is expandable to approximately 1.5 times its unexpanded diameter.

These and other objects are accomplished according to the present invention by a blind fastener assembly including a pulling pin, a sleeve and an expander. The expander is formed to be placed through an opening in a workpiece, and the pin, with the sleeve carried thereon adjacent a headed, blind side end of the pin, is placed through the expander. One end of the sleeve adjacent a tapered nose surface on the expander has a reduced radial thickness portion over a selected length thereof including a reduced outside diameter and a corresponding increased inside diameter in the portion adjacent the reduced outside diameter portion. Upon application of an axial force on the pin, the reduced thickness sleeve portion advances over the tapered nose surface of the expander forcing the reduced thickness portion radially outwardly, and continuing to advance the sleeve until it contacts the blind side of the workpiece surface. A radially outwardly extending bulb thereupon forms with its apex intermediate the end of the reduced thickness sleeve portion, and bears against the blindside workpiece surface.

A grip-accommodating feature may be included by providing a reduced varying radial thickness portion in a sleeve ajdacent the other end in contact with the pulling pin head. Continued application of axial force to the pin causes a bulb to form at this reduced thickness portion to accommodate variations in workpiece thickness.

BRIEF DESCRIPTION OF THE DRAWINGS

FIG. 1 is a cross-sectional view, with parts in elevation, illustrating one embodiment of a blind fastener assembly installed in a pair of workpieces prior to any forming operation, in accordance with the present invention.

FIG. 2 shows the embodiment of FIG. 1 in an intermediate, partially formed condition;

FIG. 3 shows the embodiment of FIG. 1 in a finally formed condition;

FIG. 3A shows a formed blind fastener assembly in FIG. 3, adhering to an irregular contour of the blindside workpiece surface;

FIG. 4 is a cross-sectional view, with parts in elevation, illustrating a second embodiment of a blind fastener assembly installed in a pair of workpieces prior to any forming operation, in accordance with the present invention;

FIG. 5 shows the embodiment of FIG. 4 in an intermediate, partially formed condition;

FIG. 6 shows the embodiment of FIG. 4 in a finally formed condition;

FIG. 7 is a cross sectional view of another embodiment of the sleeve shown in FIG. 1 illustrating another feature of the present invention.

FIG. 8 is a cross-sectional view, with parts in elevation, illustrating the sleeve shown in FIG. 7 in a finally formed condition;

FIG. 9 is a cross-sectional view of another embodiment of the sleeve/expander shown in FIG. 4;

FIG. 10 is a cross-sectional view, with parts in elevation, illustrating another embodiment of a blind fastener assembly installed in a pair of workpieces prior to any forming operation, illustrating another embodiment of a sleeve in accordance with the present invention.

FIG. 11 shows the embodiment of FIG. 10 in a finally formed condition;

FIG. 12 is a cross-sectional view of the sleeve and expander of the embodiment of FIG. 1 showing certain dimensional relationships;

FIG. 12A shows the bulb formed according to the dimensional relationships in FIG. 12;

FIG. 13 is a cross-sectional view of the sleeve and expander of the embodiment of FIG. 1 showing another possible dimensional relationship;

FIG. 13A shows the bulb formed according to the dimensional relationship of FIG. 13;

FIG. 14 illustrates grip accommodation dimensional relationships of the sleeve and expander shown in FIG. 1; and FIGS. 15 and 16 are cross-sectional views of two alternate embodiments of the sleeve shown in FIG. 14.

DESCRIPTION OF THE PREFERRED EMBODIMENTS

Referring to FIGS. 1 - 3, a first embodiment of a blind fastener assembly in accordance with the present invention is shown in varying stages of installation. Fastener assembly 10 includes a pin member 12, an expander 14 and a sleeve 16. Pin member 12 has an enlarged head 18 at one end thereof and may, in one configuration, include standard external threads 20 which are designed to engage mating threads 22 on expander 14 in order to draw sleeve 16, which is carried on the shank of pin member 12 adjacent head 18, axially toward expander 14. In the particular configuration shown, a wrenching configuration such as a pair of flats 23 are included on pin member 12 at a free end 24 for accepting a power tool driving bit. It should be understood that pin member 12 may include a plurality of circumferential grooves (not shown) adjacent end 24 instead of external threads 20 and mating threads 22 on expander 14. Such grooves are commonly employed on similar pulling pin devices and are formed to be gripped by any one of a number of convention pull-type guns for exerting the necessary axial force on pin member 12. This arrangement is not illustrated because it is quite conventional and fully known to those skilled in the art. Pin member 12 also includes a breakneck groove 26 of reduced cross-sectional diameter, which is designed to fracture at a predetermined axial or torsional load. Expander 14 includes an enlarged head 28, a shank portion 30 of constant outside diameter and a nose portion having a tapered surface 32 opposite from head end 28. Tapered surface 32 forms an angle on the order of approximately 12° with the longitudinal axis of expander 14. Expander 14 extends through aligned openings in a pair of workpieces 34 and 36, with head 28 designed to bear upon a corresponding countersunk section in workpiece 34, and outside diameter surface 31 of shank 30 designed to fit through the aligned openings with a relatively close fit, that is something less than an interference fit. Head 28 may include a recess 29 for accepting a portion of the power tool bit (not shown) to keep expander 14 from rotating during the assembly of the joint. It is to be understood that head 28 may be of any configuration while still remaining within the scope of the present invention. Sleeve 16 includes a normal radial thickness portion 38 adjacent head 18 of pin member 12, and a reduced radial thickness portion 40 adjacent tapered surface 32 of expander 14. Portion 40 includes a reduced outside diameter surface 42 and a corresponding counterbored internal diameter surface 44. A shoulder 46 joins surface 42 and the outside diameter surface of portion 38, and a shoulder 48 joins inside diameter surface 44 and the inside diameter of portion 38. Shoulder 48, preferably, but not necessarily, forms an approximate 120° included angle, while shoulder 46 preferably forms an approximate 20° angle with the longitudinal axis.

When an axial force is exerted on pin member 12, such as by torquing the pin or by pulling on the pin by means of a pull gun (not shown), surface 44 on sleeve 16 contacts tapered surface 32 on expander 14, and portion 40 begins to advance over the tapered surface, where it is expanded from its original diameter. Portion 40 continues to advance over intersection 33 of surfaces 31 and 32 along surface 31 of expander 14 until the free end 41 of portion 40 contacts the blind side surface of workpiece 36 as shown in FIG. 2. At this point, intersection 33 should be mid-way between the ends of reduced thickness portion 40 in an optimum configuration joint. Optimum dimensional relationships between the length of portion 40 and the distance from the surface of workpiece 36 to intersection 33 of expander 14 will be discussed more fully hereinafter. As pin member 12 continues to advance in an axial direction, portion 40 begins to bulb radially outwardly at approximately the middle of its length, causing a maximum diameter bulb 49 to form in an optimum configuration adjacent the surface of workpiece 36. This maximum diameter bulb is typically 1.5 times the original unexpanded diameter of sleeve 16. During the formation of bulb 49, as shoulder 48 contacts the free end of tapered surface 32, a tip portion 47 of the expander deforms shoulder 48 producing an extruding effect on the remainder of the thickened portion 38. However, shoulder 46 is not affected during this extruding process, thus insuring that reduced thickness portion 40 always remains at a fixed position forward of shoulder 46. This assures optimum formation of the bulb within the reduced thickness portion. Continued torquing or pulling of pin member 12 causes the pin to fracture at breakneck groove 26, resulting in the final assembled joint shown in FIG. 3. It should be understood that some form of locking configuration (not shown) may be provided between pin member 12 and expander 14 to keep the pin from moving in an axial direction after the joint is clamped, and to maintain preload in the joint. It should be understood that the leading edge of the reduced thickness portion of the sleeve 16 could include a radius or combination of curvatures which would help to prevent the sleeve from marring the surface of workpiece 36 as the bulb forms. It is also pointed out that reduced thickness portion 40 could be selectively annealed along its length to provide a hardness gradient with the softest point being at approximately the midpoint of portion 40 to ensure that the bulb forms at the optimum point to produce a maximum diameter and optimum shaped bulb. Lubricants can be provided between the contacting surfaces of expander 14 and sleeve 16 to reduce the forces required to expand and bulb the sleeve.

Referring now to FIG. 3A, a formed blind fastener assembly is shown wherein the bulb 49A adheres to the irregular contour of workpiece surface 36A. The present blind fastener assembly can accomplish this desirable result because of the control over the formation of the blindside bulb which will be discussed in greater detail hereinafter. Present blind fasteners generally tend to form more rigidly and straighter, thus only contacting the higher irregularities on surface 36A.

Referring now to FIGS. 4 - 6, another embodiment of the present invention is illustrated. A fastener assembly 50 includes a pin member 52 and a sleeve/expander member 54. The pin member has an enlarged head 56 and a breakneck groove 58 which function in the same manner as in pin member 12 shown in FIGS. 1 - 3. Sleeve/expander member 54 is generally similar to the configuration of expander 14 and sleeve 16 shown in FIGS. 1 - 3, except that they are joined at a frangible section 60 to form an integral member. Preferably, but not necessarily, a reverse tapered surface 55 is provided on the inner surface between the sleeve portion and the expander portion of member 54 to aid in the formation of the bulb. Upon application of an axial load to pin member 52, either by torquing or by pulling, a bulb 62 begins to form in a reduced radial thickness sleeve portion 64 (FIG. 4) as shown in FIG. 5. At some predetermined force, the sleeve portion with the bulb fully formed breaks away from the expander portion at frangible section 60. Continued axial force causes the formed bulb 62 to advance along the tapered surface nose portion of the expander where it is increased in diameter, and onto the constant outside diameter surface and thereupon clamp against the surface of workpiece 36, as shown in FIG. 6. One advantage of the configuration shown in FIG. 4 is that formation of the bulb away from the surface of workpiece 36 prevents possible marring of the workpiece surface during formation of the bulb. This feature may be desirable for certain types of composite materials.

In FIG. 7, 9 and 10, a grip accommodating feature in accordance with the present invention is illustrated in several embodiments of blind fasteners. In FIG. 7, a sleeve 66 is shown which is generally similar to sleeve 16 in FIG. 1. Sleeve 66 includes a normal radial thickness portion 68 and a reduced thickness portion 70 at one end, having a reduced outside diameter and a corresponding counterbore on the inside diameter. Portion 68 includes a section 72 of varying reduced radial thickness adjacent the other end of the sleeve. Section 72 must be of a greater thickness throughout its axial length than portion 70. Referring to FIG. 8, when pin member 12 is moved is an axial direction either by torquing or by pulling, portion 70 of sleeve 66 advances over the tapered surface nose portion 32 of expander 14 until the leading edge contacts the surface of workpiece 36. Further axial movement of pin member 12 causes the thinner radial portion 70 to form a bulb 49 at the blindside workpiece surface, as previously described with reference to FIGS. 1 - 3. After bulb 49 is formed, further axial movement of pin member 12 causes a second bulb 74 to form at section 72 in sleeve 66. Thus, any variations in the thickness of workpieces 34 and 36 can be accommodated by formation of this second bulb 74 before the breakneck groove in pin member 12 fractures at a predetermined axial position with respect to expander 14 to form the final clamped joint. In order to insure that pin member 12 stops in the same axial position each time relative to expander 14, threads 20 extend a predetermined distance on pin member 12 to a shoulder 75 having a diameter approximately equal to the major thread diameter of threads 20. If the thickness of the workpieces is closer to the maximum grip range of the blind fastener assembly, a larger bulb 74 will form before the pin fractures. If the thickness of the workpieces is closer to the minimum value of the grip range of the fastener assembly, a smaller diameter bulb 74 will form. This grip-accommodating feature in sleeve 66 is quite useful in adapting blind rivet fastener assemblies to relatively wide variations of workpiece thicknesses.

FIG. 9 illustrates yet another embodiment of the grip-accommodating feature in conjunction with the sleeve/expander of FIGS. 4 - 6. A variable reduced thickness section 76, similar to section 72 in FIG. 7, is included in the sleeve portion of a sleeve/expander 78, similar to sleeve/expander 54 in FIG. 4 - 6, and functions in the same manner as previously described. Referring to FIG. 6, after the initial bulb 62 is fully formed and clamped against the workpiece surface, further axial movement of the pin member will cause a second bulb to form at section 76, as previously described with reference to FIG. 8. The pin member will then break at a predetermined axial position with respect to the expander.

The same grip-accommodating feature can be employed on a blind fastener assembly utilizing a constant radial thickness sleeve 80, as shown in FIG. 10. A variable reduced thickness section 82 is provided adjacent the end of the sleeve in contact with head 18 of pin member 12. When axial movement is imparted to pin member 12 either by torquing or by pulling, sleeve 80 advances over tapered surface 32 and over constant outside diameter surface 31 of expander 14 until the leading edge contacts the surface of workpiece 36, as shown in FIG. 11. Further axial movement causes a bulb 84 to form at section 82 on sleeve 80 to accommodate any variations in the thickness of workpieces 34 and 36 before pin member 12 breaks at section 26 at a predetermined axial position relative to expander 14 to complete assembly of the joint. Thus the grip-accommodating feature has been shown on several embodiments of blind fastener sleeves, but it should be pointed out that the embodiments shown are by way of illustration only and are not considered to be an exhaustive list of the applications in which this feature can be employed.

Referring now to FIGS. 12 and 13, the sleeve and expander of FIGS. 1 - 3 are shown. Critical dimensional relationships will be discussed with reference to these figures. Dimension "L" represents the axial length of reduced thickness portion 40 of sleeve 16, and dimension "d" represents the distance from the surface of workpiece 36 to the intersection 33 of surfaces 31 and 32 on expander 14. A critical dimensional relationship exists between the position of expander 14 relative to the position of sleeve 16 at the time during installation when the leading edge 41 of the sleeve contacts the surface of workpiece 36. As mentioned previously with respect to the formation of the joint in FIGS. 1 - 3, reduced thickness portion 40 advances along surfaces 32 and 31 of expander 14, and is deformed at intersection point 33 when the leading edge 41 of sleeve 16 contacts the surface of workpiece 36. This is true, however, only if intersection 33 is located somewhere within dimension "L" of portion 40 on sleeve 16 when edge 41 contacts the surface of workpiece 36. The optimum location of intersection 33 is when $d = L/2$, since with this dimensional configuration, the bulb will start to form in the center of the column (reduced thickness portion 40), producing an optimum-shaped, maximum diameter bulb 86, as shown in FIG. 12A. If intersection 33 is not located within dimension "L", as shown in FIG. 13, a bulb 88 of smaller diameter will form adjacent the surface of workpiece 36. As can be seen in FIG. 13A, bulb 88 is not optimally formed as is bulb 86 in FIG. 12A. Since intersection 33 is not located within length "L" of reduced thickness portion 40 on sleeve 16, the intersection has no effect on where the bulb forms. In this configuration, the column can be considered as having a free end 41 where it contacts the surface of workpiece 36, and a fixed restraint at shoulder 46 where it joins the normal thickness portion 38 of sleeve 16. The result of this configuration is non-symmetrically formed bulb 88, being smaller in diameter and having a gap 89 between normal thickness portion 38 and bulb 88.

In order to minimize the overall length of the fastener assembly, dimension "d" should be the minimum length at which an optimum-shaped, maximum diameter bulb will form.

Referring now to FIG. 14, if the fastener is to accommodate a range of grip lengths, then the following optimum dimensional relationships should be used:

$$d_{MAX} = (L/2) + (G/2)$$

$$d_{MIN} = (L/2) - (G/2)$$

where $G$ = a predetermined variation in workpiece thickness commonly referred to as a grip-accommodation. A typical grip-accommodation value usable in accordance with the present invention is 1/16 inch. Beyond "$d_{Min}$" or less, the resultant bulb tends to form to a smaller final diameter due to the location of insersection 33, and, correspondingly, beyong "$d_{Max}$" or greater, the resultant bulb also tends to form at a smaller diameter, as shown for example in FIG. 13A. Therefore, exceeding the optimum dimensional range results in a less than optimum bulb diameter and shape.

FIGS. 15 and 16 illustrate two additional sleeve configurations for which the above-described optimum dimensional relationships should be used in order to accommodate a range of grip lengths. In FIG. 15, a sleeve 90 includes a reduced thickness portion 92 and a normal thickness portion 94. Reduced thickness portion 92 has a reduced radial distance to the outside surface 96 relative to the radial distance to the outside surface 98 of normal thickness portion 94. In FIG. 16, a sleeve 100 includes a reduced thickness portion 102 and a normal thickness portion 104. Reduced thickness portion 102 has an increased radial distance to the inside surface 106 relative to the radial distance to the inside surface 108 of normal thickness portion 104.

For a predetermined grip-accommodation value "G", optimum dimensional ranges have been determined for a nominal 3/16 inch diameter, and a nominal ¼ inch diameter blind fastener assembly. For a 3/16 inch diameter assembly, $$d = 0.25\,L \text{ to } 0.75\,L$$

and for a ¼ inch diameter assembly, $$d = 0.33\,L \text{ to } 0.65\,L$$

These dimensional ranges have generally yielded optimum-shaped, maximum diameter bulbs for the two sizes listed.

Having thus described several embodiments of the present invention, some of the advantages should now be readily apparent. Formation of an optimum-shaped, maximum diameter bulb which will repeatably form adjacent the blindside workpiece surface is achieved by the present invention. The bulb will form against an irregularly contoured surface. There is no radial expansion of the workpiece holes during the forming of the joint. A novel grip-accommodating feature which can be used over a relatively wide variation in workpiece thicknesses can be employed on the blind fastener assembly of the present invention. Because of the controlled size and shape of the bulb which is formed, the blind fastener assembly of the present invention is ideally suited for use with advanced composite materials. It should also be clearly understood that the blind fastener assembly of the present invention is equally useful with conventional aerospace materials.

While in the foregoing there have been described several preferred embodiments of the invention, it should be understood that various changes and modifications can be made without departing from the true spirit and scope of the invention as recited in the appended claims.

We claim:

1. A blind fastener assembly for installation in a workpiece having an opening therein, said assembly comprising:

a pin member having an enlarged head at one end thereof, an elongated shank portion and means on said shank portion operative to advance said pin member in a direction along its longitudinal axis;

expander means having an enlarged head at one end thereof formed to bear upon an accessible surface of the workpiece, a tapered surface of varying radial thickness in a longitudinal direction adjacent the other end thereof, said tapered surface varying from a minimum radial thickness at said other end to a maximum radial thickness at a locus of points spaced from said other end, and a shank portion intermediate said enlarged head and said tapered surface, said shank portion having an outer surface formed to be placed in the workpiece opening, and an internal bore extending through said expander means carrying said pin member shank portion; and expandable sleeve means carried on said pin member shank portion proximate said enlarged head, said sleeve means including a first portion of greater radial thickness adjacent one end thereof proximate said pin member enlarged head and a second portion of reduced radial thickness adjacent the other end thereof juxtaposed from said minimum thickness end of said expander means tapered surface, said second portion having a reduced radial distance to the outside surface thereof and an increased radial distance to the inside surface thereof each relative to the radial distance to the respective outside and inside surfaces of said first portion, whereby there is a discontinuity in the outside surface and in the inside surface of said sleeve means at the junction of said first and said second portions, said sleeve second portion being adapted to be advanced along said expander tapered surface and said expander outer surface and expanded thereover upon advancement of said pin member toward a blind side surface of the workpiece, said other end of said sleeve means ultimately contacting the blind side workpiece surface and forming a radially outwardly extending bulb with its apex intermediate the ends of said second portion, said bulb bearing against the blind side workpiece surface.

2. A blind fastener assembly in accordance with claim 1 wherein said expander means and said sleeve means are an integral unit with a frangible section therebetween.

3. A blind fastener assembly in accordance with claim 1 wherein said pin member further includes a portion of reduced cross-section designed to break at a predetermined load greater than the load necessary to form said bulb.

4. A blind fastener assembly in accordance with claim 1 wherein said means on said shank portion operative to advance said pin member is an external thread, and wherein said expander means further includes a mating internal thread on said internal bore thereof.

5. A blind fastener assembly in accordance with claim 1 wherein said expander means tapered surface forms an angle on the order of 12° with the longitudinal axis of said expander means.

6. A blind fastener assembly in accordance with claim 1 wherein said sleeve means further includes a section of reduced varying radial thickness in said sleeve first portion intermediate the ends thereof, said section being of greater radial thickness than said sleeve second portion, whereby upon formation of said bulb in said sleeve second portion, further advancement of said pin member toward the blind side workpiece surface causes a second radially outwardly extending bulb to form at said section to accommodate variations in the thickness of the workpiece.

7. A blind fastener assembly in accordance with claim 1 wherein a first distance from the blind side workpiece surface to said maximum radial thickness of said expander means tapered surface is less than the axial length of said sleeve second portion.

8. A blind fastener assembly in accordance with claim 7 wherein said first distance is equal to approximately one half of the axial length of said sleeve second portion.

9. A blind fastener assembly in accordance with claim 7 wherein said first distance is within a range of approximately 0.25 to 0.75 times the axial length of said sleeve second portion for a nominal 3/16 inch diameter blind fastener assembly.

10. A blind fastener assembly in accordance with claim 7 wherein said first distance is within a range of approximately 0.33 to 0.65 times the axial length of said sleeve second portion for a nominal ¼ inch diameter blind fastener assembly.

11. A blind fastener assembly in accordance with claim 1 wherein said expander means has an axial length such that a maximum distance from the blind surface of one of the workpieces to said maximum radial thickness of said expander means tapered surface is equal to approximately one half of the axial length of said sleeve second portion plus one half of a predetermined grip range.

12. A blind fastener assembly in accordance with claim 1 wherein said expander means has an axial length such that a minimum distance from the blind surface of one of the workpieces to said maximum radial thickness of said expander means tapered surface is equal to approximately one half of the axial length of said sleeve second portion minus one half of a predetermined grip range.

13. A blind fastener assembly for installation in a workpiece having an opening therein, said assembly comprising:

a pin member having an enlarged head at one end thereof, an enlongated shank portion and means on said shank portion operative to advance said pin member in a direction along its longitudinal axis;

expander means having an enlarged head at one end thereof formed to bear upon an accessible surface of the workpiece, a tapered surface of varying radial thickness in a longitudinal direction adjacent the other end thereof, said tapered surface varying from a minimum radial thickness at said other end to a maximum radial thickness at a locus of points spaced from said other end, and a shank portion intermediate said enlarged head and said tapered surface, said shank portion having an outer surface formed to be placed in the workpiece opening, whereby a portion of said shank portion outer surface is confined and a portion extends beyond an inaccessible surface of the workpiece and is unconfined, and an internal bore extending through said expander means carrying said pin member shank portion; and expandable sleeve means carried on said pin member shank portion proximate said enlarged head, said sleeve means including a first portion of greater radial thickness adjacent one end thereof proximate said pin member enlarged head and a second portion of reduced radial thickness adjacent the other end thereof juxtaposed from said minimum thickness end of said expander means tapered surface, said second portion having a reduced radial distance to the outside surface thereof relative to the radial distance to the outsider surface of said first portion, whereby there is a discontinuity in the outside surface of said sleeve means at the junction of said first and said second portions, said expander means having an axial length such that the unconfined portion of said expander means shank portion outer surface is less than approximately one half of the axial length of said sleeve second portion plus one half of a predetermined grip range and greater than approximately one half of the axial length of said sleeve second portion minus one half of a predetermined grip range, said sleeve second portion being adapted to be advanced along said expander means tapered surface and said expander means outer surface and expanded thereover upon advancement of said pin member toward the inaccessible workpiece surface, said other end of said sleeve means ultimately contacting the inaccessible workpiece surface and forming a radially outwardly extending bulb with its apex intermediate the ends of said second portion, said bulb bearing against the inaccessible workpiece surface.

14. A blind fastener assembly in accordance with claim 13 wherein said first distance is equal to approximately one half of the axial length of said sleeve second portion.

15. A blind fastener assembly in accordance with claim 13 wherein said first distance is within a range of approximately 0.25 to 0.75 times the axial length of said sleeve second portion for a nominal 3/16 inch diameter blind fastener assembly.

16. A blind fastener assembly in accordance with claim 13 wherein said first distance is within a range of approximately 0.33 to 0.65 times the axial length of said sleeve second portion for a nominal ¼ inch diameter blind fastener assembly.

17. A blind fastener assembly in accordance with claim 13 wherein said pin member further includes a portion of reduced cross-section designed to break at a predetermined load greater than the load necessary to form said bulb.

18. A blind fastener assembly in accordance with claim 13 wherein said means on said shank portion operative to advance said pin member is an external thread, and wherein said expander means further includes a mating internal thread on said internal bore thereof.

19. A blind fastener assembly in accordance with claim 13 wherein said expander means tapered surface forms an angle on the order of 12° with the longitudinal axis of said expander means.

20. A blind fastener assembly in accordance with claim 13 wherein said sleeve means further includes a section of reduced varying radial thickness in said sleeve first portion intermediate the ends thereof, said section being of greater radial thickness than said sleeve second portion, whereby upon formation of said bulb in said sleeve second portion, further advancement of said pin member toward the blind side workpiece surface causes a second radially outwardly extending bulb to form at said section to accommodate variations in the thickness of the workpiece.

21. A blind fastener assembly for installation in a workpiece having an opening therein, said assembly comprising:
   a pin member having an enlarged head at one end thereof, an elongated shank portion and means on said shank portion operative to advance said pin member in a direction along its longitudinal axis;
   expander means having an enlarged head at one end thereof formed to bear upon an accessible surface of the workpiece, a tapered surface of varying radial thickness in a longitudinal direction adjacent the other end thereof, said tapered surface varying from a minimum radial thickness at said other end to a maximum radial thickness at a locus of points spaced from said other end, and a shank portion intermediate said enlarged head and said tapered surface, said shank portion having an outer surface formed to be placed in the workpiece opening, whereby a portion of said shank portion outer surface is confined and a portion extends beyond an inaccessible surface of the workpiece and is unconfined, and an internal bore extending through said expander means carrying said pin member shank portion; and
   expandable sleeve means carried on said pin member shank portion proximate said enlarged head, said sleeve means including a first portion of greater radial thickness adjacent one end thereof proximate said pin member enlarged head and a second portion of reduced radial thickness adjacent the other end thereof juxtaposed from said minimum thickness end of said expander means tapered surface, said second portion having an increased radial distance to the inside surface thereof relative to the radial distance to the inside surface of said first portion, wherein there is a discontinuity in the inside surface of said sleeve means at the junction of said first and said second portions, said expander means having an axial length such that the unconfined portion of said expander means shank portion outer surface is less than approximately one half of the axial length of said sleeve second portion plus one half of a predetermined grip range and greater than approximately one half of the axial length of said sleeve second portion minus one half of a predetermined grip range, said sleeve second portion being adapted to be advanced along said expander means tapered surface and said expander means outer surface and expanded thereover upon advancement of said pin member toward the inaccessible workpiece surface, said other end of said sleeve means ultimately contacting the inaccessible workpiece surface and forming a radially outwardly extending bulb with its apex intermediate the ends of said second portion, said bulb bearing against the inaccessible workpiece surface.

22. A blind fastener assembly in accordance with claim 21 wherein said first distance is equal to approximately one half of the axial length of said sleeve second portion.

23. A blind fastener assembly in accordance with claim 21 wherein said first distance is within a range of approximately 0.25 to 0.75 times the axial length of said sleeve second portion for a nominal 3/16 inch diameter blind fastener assembly.

24. A blind fastener assembly in accordance with claim 21 wherein said first distance is within a range of approximately 0.33 to 0.65 times the axial length of said sleeve second portion for a nominal ¼ inch diameter blind fastener assembly.

25. A blind fastener assembly in accordance with claim 21 wherein said pin member further includes a portion of reduced cross-section designed to break at a predetermined load greater than the load necessary to form said bulb.

26. A blind fastener assembly in accordance with claim 21 wherein said means on said shank portion operative to advance said pin member is an external thread, and wherein said expander means further includes a mating internal thread on said internal bore thereof.

27. A blind fastener assembly in accordance with claim 21 wherein said expander means tapered surface forms an angle on the order of 12° with the longitudinal axis of said expander means.

28. A blind fastener assembly in accordance with claim 21 wherein said sleeve means further includes a section of reduced varying radial thickness in said sleeve first portion intermediate the ends thereof, said section being of greater radial thickness than said sleeve second portion, whereby upon formation of said bulb in said sleeve second portion, further advancement of said pin member toward the blind side workpiece surface causes a second radially outwardly extending bulb to form at said section to accommodate variations in the thickness of the workpiece.

29. A joint assembly comprising:
   a workpiece having a first surface, a second surface and a hole therebetween;
   a pin member having an enlarged head at one end thereof, an elongated shank portion and means on said shank portion operative to advance said pin member in a direction along its longitudinal axis;
   expander means having an enlarged head at one end thereof formed to bear on said first workpiece surface, a tapered surface of varying radial thickness in a longitudinal direction adjacent the other end thereof, said tapered surface varying from a minimum radial thickness at said other end to a maximum radial thickness at a locus of points spaced from said other end, and a shank portion intermediate said enlarged head and said tapered surface, said shank portion having an outer surface formed to be placed in said workpiece opening, and an internal bore extending through said expander means carrying said pin member shank portion; and
   expandable sleeve means carried on said pin member shank portion proximate said enlarged head, said sleeve means including a first portion of a greater radial thickness adjacent one end thereof proximate said pin member enlarged head and a second portion of reduced radial thickness adjacent the other end thereof juxtaposed from said minimum thickness end to said expander means tapered surface, said second portion having a reduced radial distance to the outside surface thereof and an increased radial distance to the inside surface thereof each relative to the radial distance to the respective outside and inside surfaces of said first portion, whereby there is a discontinuity in the outside surface and in the inside surface of said sleeve means at the junction of said first and said second portions, said sleeve second portion being adapted to be advanced along said expander tapered surface and said expander outer surface and expanded thereover upon advancement of said pin member toward said second workpiece surface, said other end of said sleeve means ultimately contacting said second workpiece surface and forming a radially outwardly extending bulb with its apex intermediate the ends of said second portion, said bulb bearing against said second workpiece surface.

30. A joint assembly in accordance with claim 29 wherein said expander means and said sleeve means are an integral unit with a frangible section therebetween.

31. A joint assembly in accordance with claim 29 wherein said pin member further includes a portion of reduced cross-section designed to break at a predetermined load greater than the load necessary to form said bulb.

32. A joint assembly in accordance with claim 29 wherein said means on said shank portion operative to advance said pin member is an external thread, and wherein said expander means further includes a mating internal thread on said internal bore thereof.

33. A joint assembly in accordance with claim 29 wherein said expander means tapered surface forms an angle on the order of 12° with the longitudinal axis of said expander means.

34. A joint assembly in accordance with claim 29 wherein said sleeve means further includes a section of reduced varying radial thickness in said sleeve first portion intermediate the ends thereof, said section being of greater radial thickness than said sleeve portion, whereby upon formation of said bulb in said sleeve second portion, further advancement of said pin member toward said workpiece second surface causes a second radially outwardly extending bulb to form at said section to accommodate variations in the thickness of the workpiece.

35. A joint in accordance with claim 29 wherein a first distance from said workpiece second surface to said maximum radial thickness of said expander means tapered surface is less than the axial length of said sleeve second portion.

36. A joint assembly in accordance with claim 35 wherein said first distance is equal to approximately one half of the axial length of said sleeve second portion.

37. A joint assembly in accordance with claim 35 wherein said first distance is within a range of approximately 0.25 to 0.75 times the axial length of said sleeve second portion for a nominal 3/16 inch diameter blind fastener assembly.

38. A joint assembly in accordance with claim 35 wherein said first distance is within a range of approximately 0.33 to 0.65 times the axial length of said sleeve second portion for a nominal ¼ inch diameter blind fastener assembly.

39. A joint assembly in accordance with claim 29 wherein said expander means has an axial length such that a maximum distance from the blind surface of one of the workpieces to said maximum radial thickness of said expander means tapered surface is equal to approximately one half of the axial length of said sleeve second portion plus one half of a predetermined grip range.

40. A joint assembly in accordance with claim 29 wherein said expander means has an axial length such that a minimum distance from the blind surface of one of the workpieces to said maximum radial thickness of said expander means tapered surface is equal to approximately one half of the axial length of said sleeve second portion minus one half of a predetermined grip range.

41. A joint in accordance with claim 29 wherein said workpiece second surface has an irregularly shaped contour, and wherein the surface of said bulb conforms to the irregular contour of said workpiece second surface.

* * * * *